(12) United States Patent
Steinberger

(10) Patent No.: US 8,403,762 B2
(45) Date of Patent: Mar. 26, 2013

(54) SINGLE ROW SERIES DAMPER WITH INPUT FLANGE

(75) Inventor: Markus Steinberger, Macedonia, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/108,248

(22) Filed: May 16, 2011

(65) Prior Publication Data

US 2011/0287844 A1  Nov. 24, 2011

Related U.S. Application Data

(60) Provisional application No. 61/345,893, filed on May 18, 2010.

(51) Int. Cl.
*F16F 15/123* (2006.01)

(52) U.S. Cl. ...................................... 464/68.1; 192/3.29

(58) Field of Classification Search .............. 464/66.1, 464/68.1, 68.2, 68.9; 74/574.2; 192/3.28–3.3, 192/30 V, 70.17, 200–214.1
See application file for complete search history.

(56) References Cited

U.S. PATENT DOCUMENTS

| | | | | |
|---|---|---|---|---|
| 4,422,535 | A * | 12/1983 | Ling | 192/3.28 |
| 6,026,940 | A * | 2/2000 | Sudau | 192/3.28 |
| 6,695,110 | B2 | 2/2004 | Maienschein et al. | |
| 7,267,211 | B2 | 9/2007 | Yamashita et al. | |
| 2009/0125202 | A1 | 5/2009 | Swank et al. | |
| 2010/0096788 | A1 | 4/2010 | Farahati et al. | |
| 2010/0269497 | A1 * | 10/2010 | Engelmann et al. | |
| 2011/0247322 | A1 | 10/2011 | Lindemann et al. | |

FOREIGN PATENT DOCUMENTS

WO  WO 2009067988 A1 *  6/2009
WO  WO 2010000220 A1 *  1/2010

* cited by examiner

*Primary Examiner* — Gregory Binda
*Assistant Examiner* — Josh Skroupa

(57) ABSTRACT

A damper for a torque converter includes an input flange with a first spring guiding portion and arranged for connection to a cover for the torque converter, an output flange with a second spring guiding portion and arranged for connection to an input shaft for a transmission, and an intermediate flange. The intermediate flange includes at least two plates. The first and second spring guiding portions are disposed axially between the plates. In some example embodiments, the first and second spring guiding portions are radially aligned and circumferentially offset.

20 Claims, 6 Drawing Sheets ically, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

SINGLE ROW SERIES DAMPER WITH INPUT FLANGE

CROSS-REFERENCE TO RELATED APPLICATIONS

This application claims the benefit under 35 U.S.C. §119 (e) of U.S. Provisional Application No. 61/345,893, filed May 18, 2010, which application is incorporated herein by reference.

FIELD

The invention relates generally to a damper for a torque converter, and more specifically to a series damper for a torque converter having an input flange.

BACKGROUND

Series dampers for torque converters are known. Examples are shown in U.S. Pat. No. 7,267,211 by Yamashita et al. and commonly assigned U.S. Pat. No. 6,695,110 by Maienschein et al. Series dampers combined with pendulum dampers are known from commonly assigned U.S. patent application Ser. No. 12/766,570, published as United States Patent Application Publication No. 2010/0269497 A1, the entire disclosure of which is incorporated herein by reference.

Series dampers combined with turbine mass absorbers are known from commonly assigned U.S. patent application Ser. No. 12/291,212, published as United States Patent Application Publication No. 2009/0125202 A1, the entire disclosure of which is incorporated herein by reference. Double path dampers are known from commonly assigned U.S. patent application Ser. No. 12/579,689 published as United States Patent Application Publication No. 2010/0096788 A1, the entire disclosure of which is incorporated herein by reference.

BRIEF SUMMARY

Example aspects broadly comprise a damper for a torque converter including an input flange with a first spring guiding portion and arranged for connection to a cover for the torque converter, an output flange with a second spring guiding portion and arranged for connection to an input shaft for a transmission, and an intermediate flange. The intermediate flange includes at least two plates. The first and second spring guiding portions are disposed axially between the plates. In some example embodiments, the first and second spring guiding portions are radially aligned and circumferentially offset.

In some example embodiments the damper includes a first elastic element circumferentially disposed within the first spring guiding portion and operating in a torque path between the input flange and the intermediate flange and a second elastic element circumferentially disposed within the second spring guiding portion and operating in a torque path between the intermediate flange and the output flange. In an example embodiment, the first and second elastic elements include coil springs. In some example embodiments, the damper includes a turbine assembly. The turbine assembly is attached to at least one of the at least two plates. In an example embodiment, the damper assembly includes a bearing side plate. The turbine assembly and the bearing side plate are fixedly attached to the at least one plate by riveting.

In some example embodiments, the damper includes a pendulum assembly. The pendulum assembly is attached to at least one of the at least two plates. In an example embodiment, the pendulum assembly is disposed radially outside of the elastic elements. In some example embodiments, the damper includes a tilger damper with an elastic element and a friction element. The turbine assembly is attached to the at least one plate by the tilger damper. In some example embodiments, the tilger elastic element is disposed radially outside of the first and second elastic elements. In an example embodiment, the tilger friction element is disposed radially inside of the first and second elastic elements.

Other example aspects broadly comprise a damper assembly for a torque converter including an input flange clutchingly engaged with a cover for the torque converter, an output flange arranged for driving engagement with an input shaft for a transmission, and a cover plate. The damper includes a first spring set disposed at a first radius and drivingly engaged with the input flange and the cover plate and a second spring set disposed at the first radius and drivingly engaged with the cover plate and the output flange. In some example embodiments, the input flange, output flange, cover plate, first spring set, and second spring set include a first damper. The damper assembly includes a second damper installed on the cover plate.

In an example embodiment, the second damper is a pendulum damper or a tilger damper. In an example embodiment, the tilger damper is a turbine mass absorber. In some example embodiments, the damper includes a third spring set drivingly engaged with the input flange and the output flange. In an example embodiments, the third spring set is disposed at the first radius. In an example embodiment, the third spring set is disposed at a second radius, different than the first radius. In an example embodiment, the damper includes a pendulum damper operating on the cover plate.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
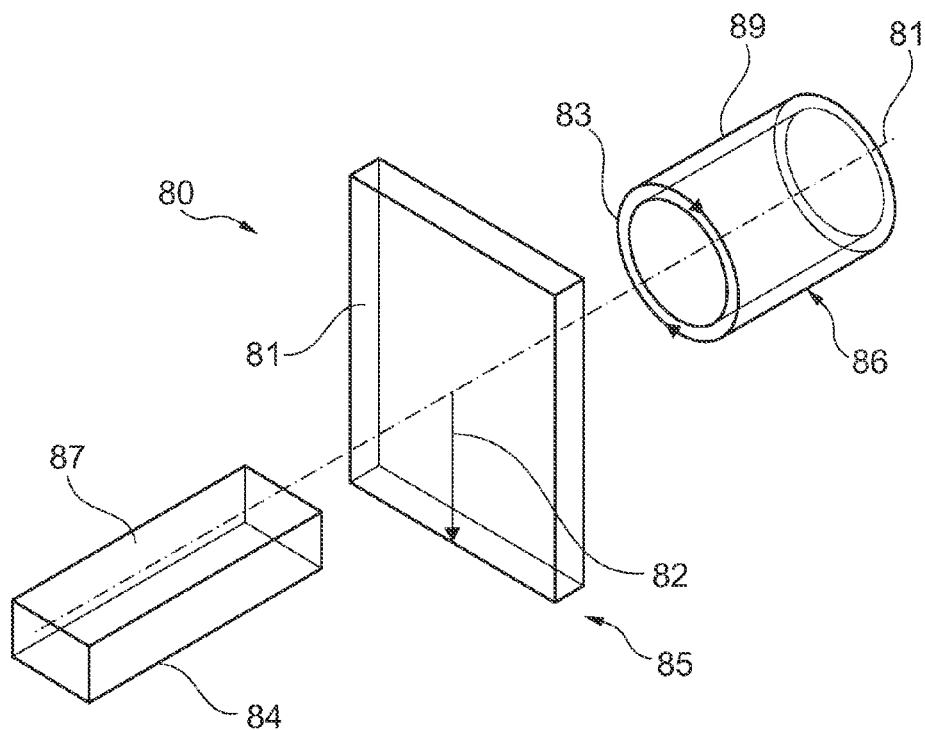
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
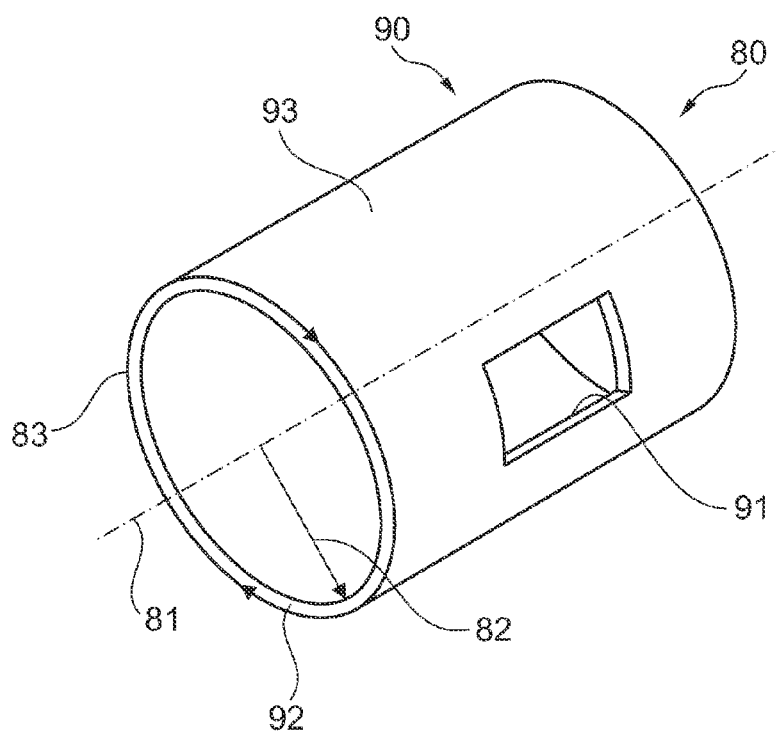
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
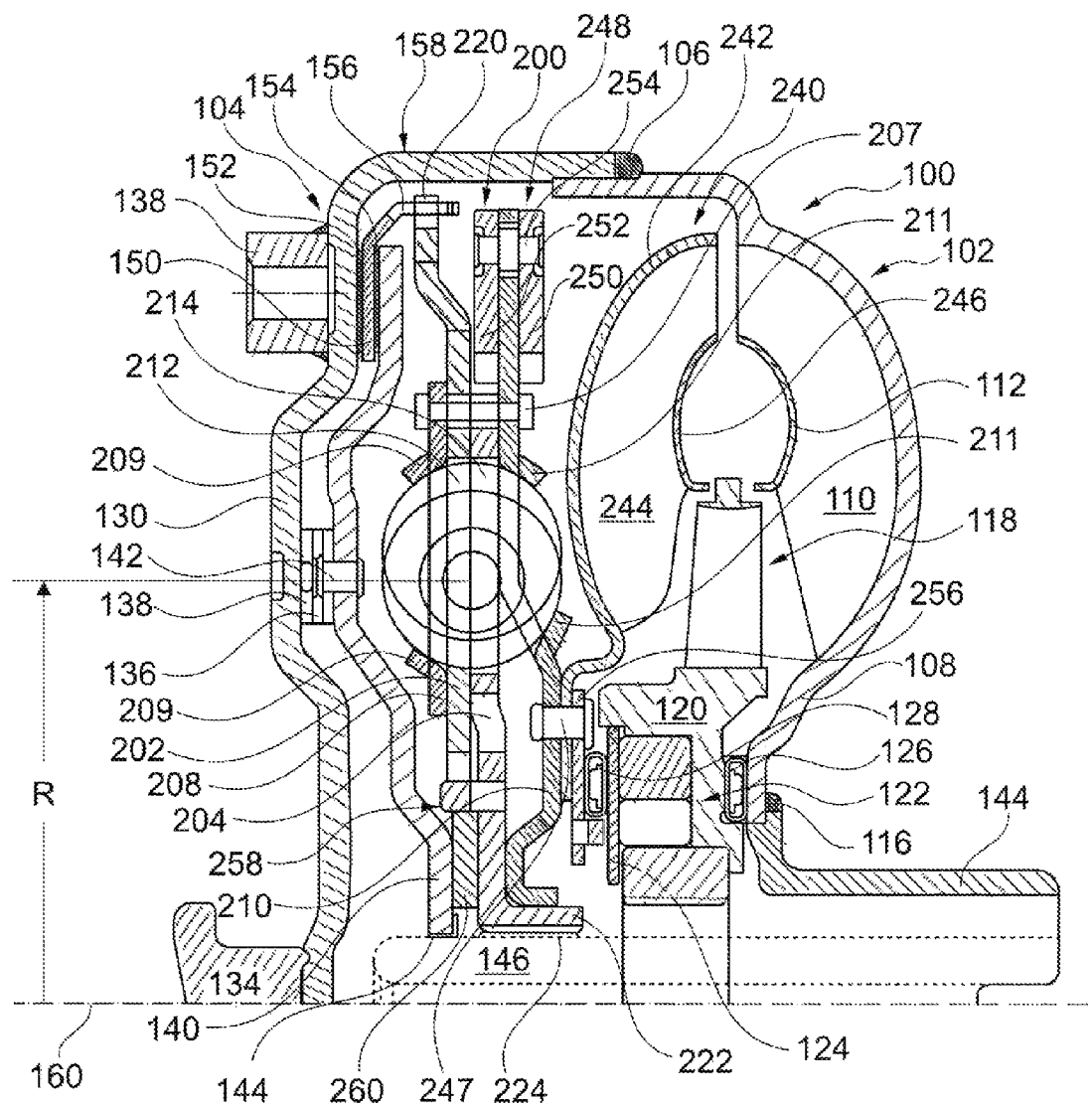
FIG. 2 is a top half section view of a torque converter including a damper assembly according to an example aspect.

The following description is made with reference to FIG. 2. FIG. 2 is a top half section view of a torque converter 100 including damper assembly 200. Torque converter 100 includes impeller assembly 102 and cover assembly 104 fixedly connected at weld 106. Impeller assembly 102 includes shell 108, blades 110, core ring 112, and hub 114 attached by weld 116. Converter 100 also includes stator assembly 118 including housing 120, one-way clutch assembly 122, and side plate 124. Bearings 126 and 128 axially position stator assembly 118.

Cover assembly 104 includes shell 130 attached to lug 132 and pilot 134 by welding, for example. Lug 132 is for fixedly connecting assembly 100 to a prime mover (such as an engine, not shown) and pilot 134 is for centering assembly 100 relative to a crankshaft for the engine (not shown). Shell 130 is attached to leaf spring 136 by extruded rivet 138. Spring 136 is drivingly engaged with piston plate 140 by rivet 142. That is, leaf spring 136 drivingly engages cover assembly 104 with piston plate 140, while still allowing axial motion of piston plate 140 relative to cover assembly 104. It should be noted that piston plate 140 may be drivingly engaged with cover assembly 104 through a separate plate attached to shell 130, or clutchingly engaged with cover assembly 104 without a connection element such as leaf spring 136.

Piston plate 140 includes element 144 arranged for sealing engagement with transmission input shaft 146 (shown as dashed lines in FIG. 2). Drive plate assembly 148 includes plate 150 and friction rings 152 and 154. Rings 152 and 154 may be attached to plate 150 by adhesive, for example. Plate 150 includes axial tabs 156 for driving engagement with damper assembly 200, as described below. Piston plate 140, drive plate 148 and cover assembly 104 comprise clutch assembly 158.

Figure 3:
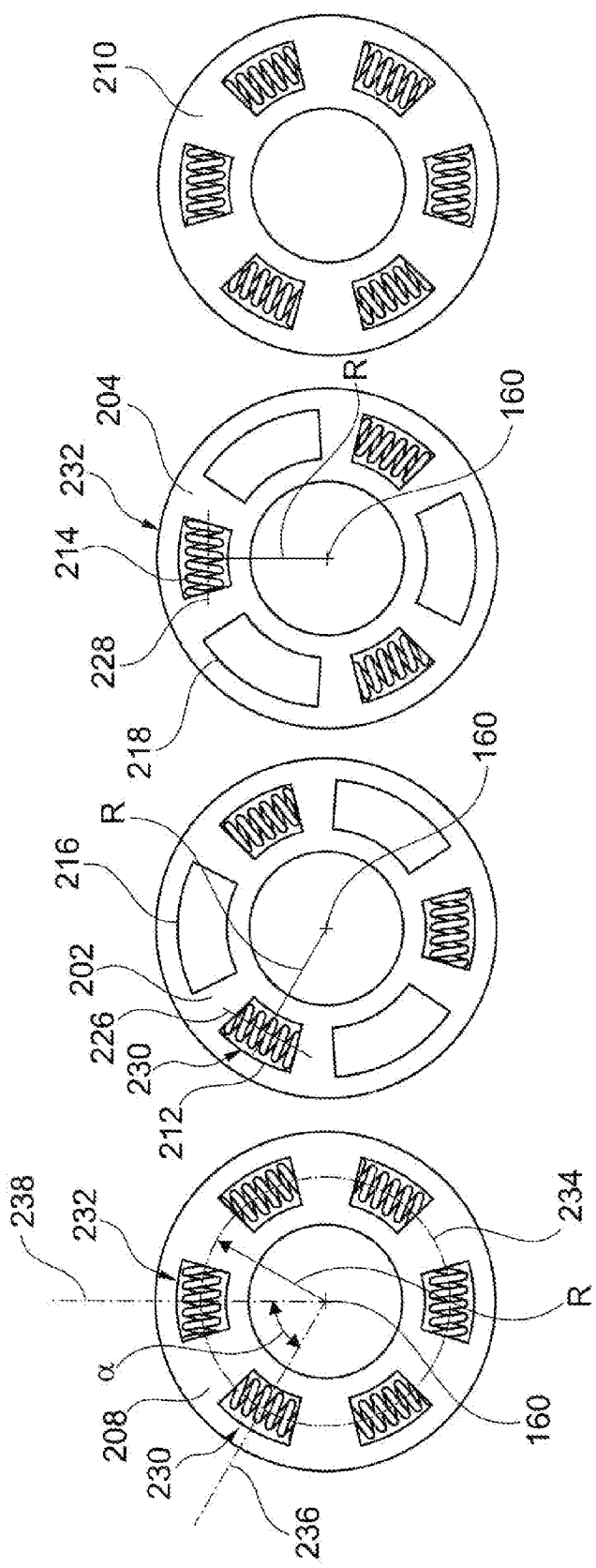
FIG. 3 is a simplified exploded view of the damper assembly of FIG. 2.
Figure 4:
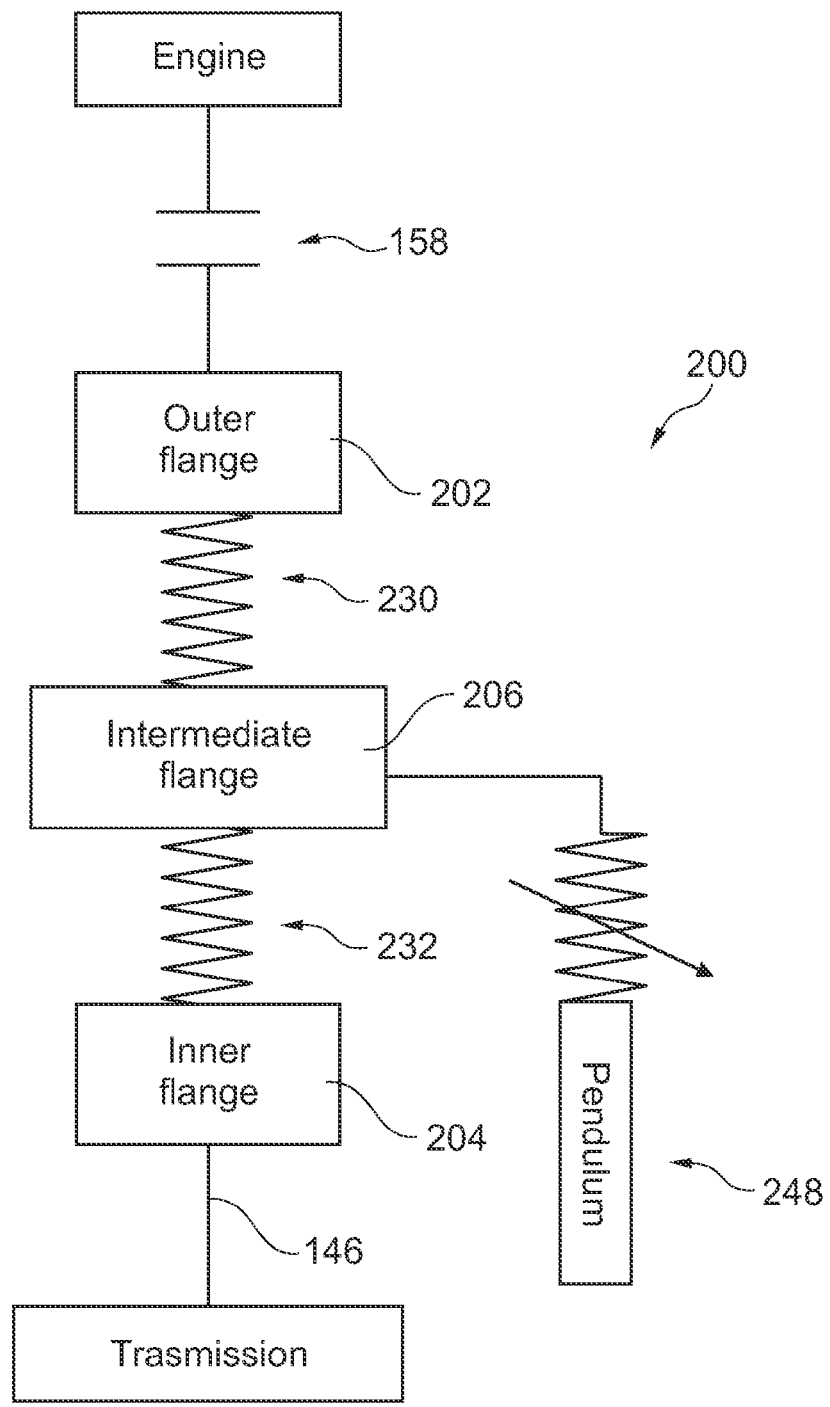
FIG. 4 is a schematic view of the damper assembly of FIG. 2.

The following description is made with reference to FIGS. 2-4. FIG. 3 is a simplified exploded view of damper assembly 200 of FIG. 2. FIG. 4 is a schematic view of damper assembly 200 of FIG. 2. Damper 200 for torque converter 100 includes input flange, or outer flange, 202, output flange, or inner flange, 204 and intermediate flange 206. In some example embodiments, intermediate flange 206 includes cover plates 208 and 210, with respective axial restraint portions 209 and 211. Cover plates 208 and 210 are fixedly attached by sheet metal rivet 207. Rotational windup of damper 200 may be limited by interaction of rivet 207 with flanges 202 and 204 as is known in the art. Flanges 202 and 204 include respective spring guiding portions 212 and 214. In some example embodiments, portions 212 and 214 are apertures or spring windows. Flanges 202 and 204 include respective clearance windows 216 and 218.

Flange 202 is arranged for connection to cover 104. That is, flange 202 includes radial extension 220 drivingly engaged with drive plate axial tabs 156. During operation of torque converter 100, engagement of clutch 158 engages plate 150 with cover 104, and, in turn, engages flange 202 with cover 104. Clutch 158 may be engaged in any manner known in the art. Clutch 158 may be engaged by hydraulic pressure, for example.

Flange 204 is arranged for connection to input shaft 146 for a transmission (not shown). That is, flange 204 includes hub portion 222 engaged with input shaft 146. Hub 222 and shaft 146 may be engaged in any manner known in the art. Hub 222 and shaft 146 may be engaged by splines 224, for example. As can best be seen in FIG. 2, respective spring guiding portions 212 and 214 of flanges 202 and 204 are disposed axially between plates 208 and 210.

In some example embodiments, spring guiding portions 212 and 214 are radially aligned. That is, respective centerlines 226 and 228 for elastic elements 230 and 232 disposed in respective guiding portions 212 and 214 are both located at distance R from torque converter centerline 160. Otherwise stated, circular centerline 234 passing through respective centers of elements 230 and 232 has a constant radius R measured from centerline 160. In some example embodiments, spring guiding portions 212 and 214 are circumferentially offset. That is, centerlines 236 and 238 passing through respective midpoints of guiding portions 212 and 214 are circumferentially offset by angle α.

In an example embodiment, element 230 is circumferentially disposed within spring guiding portion 212 and operates in a torque path between flange 202 and flange 206. Element 232 is circumferentially disposed within spring guiding portion 214 and operates in a torque path between flange 206 and flange 204. Elastic elements 230 and 232 may be any elastic elements known in the art, including rubber cylinders or pressurized pistons. In the example embodiment shown in FIG. 3, elements 230 and 232 are coil springs.

Damper assembly 200 includes turbine assembly 240. Turbine assembly 240 includes shell 242, blades 244 and core ring 246. In an example embodiment, turbine assembly 240 is attached to plate 210 by rivet 247, for example. In an example embodiment, damper assembly 200 includes pendulum assembly 248. Assembly 248 includes pendulum plates 250 and 252, and roller 254. Assembly 248 is attached to plate 210. That is, roller 254 is disposed in a slot (not shown) of plate 210 so that pendulum motion operates on plate 210. Assembly 248 is disposed radially outside of elastic elements 230 and 232. A detailed description of an example pendulum assembly can be found in commonly assigned U.S. patent application Ser. No. 12/766,570, published as United States Patent Application Publication No. 2010/0269497 A1.

Engagement of flange 202 with cover 104 advantageously permits attachment of pendulum assembly 248 to plate 210. Because plate 210 is disposed an axially distal end of damper 200, forming of plate 210 is unnecessary to permit clearance for pendulum plate 252. Therefore, mass of plate 252 can be maximized improving operation of damper 248. That is, if plate 208 was directly engaged with cover 104, damper 248 would be attached to flange 202. In order to provide axial space for plate 252, a bend would be required in flange 202 and inside diameter of plate 252 would be increased, reducing mass of plate 252 and hindering performance of damper 248.

In an example embodiment, damper assembly 200 includes bearing side plate 256 attached to turbine assembly 240 and plate 210 by rivet 247. Flange 204 may include centering tab 258 for radial position of flange 202 and thrust washer 260.

Figure 5:
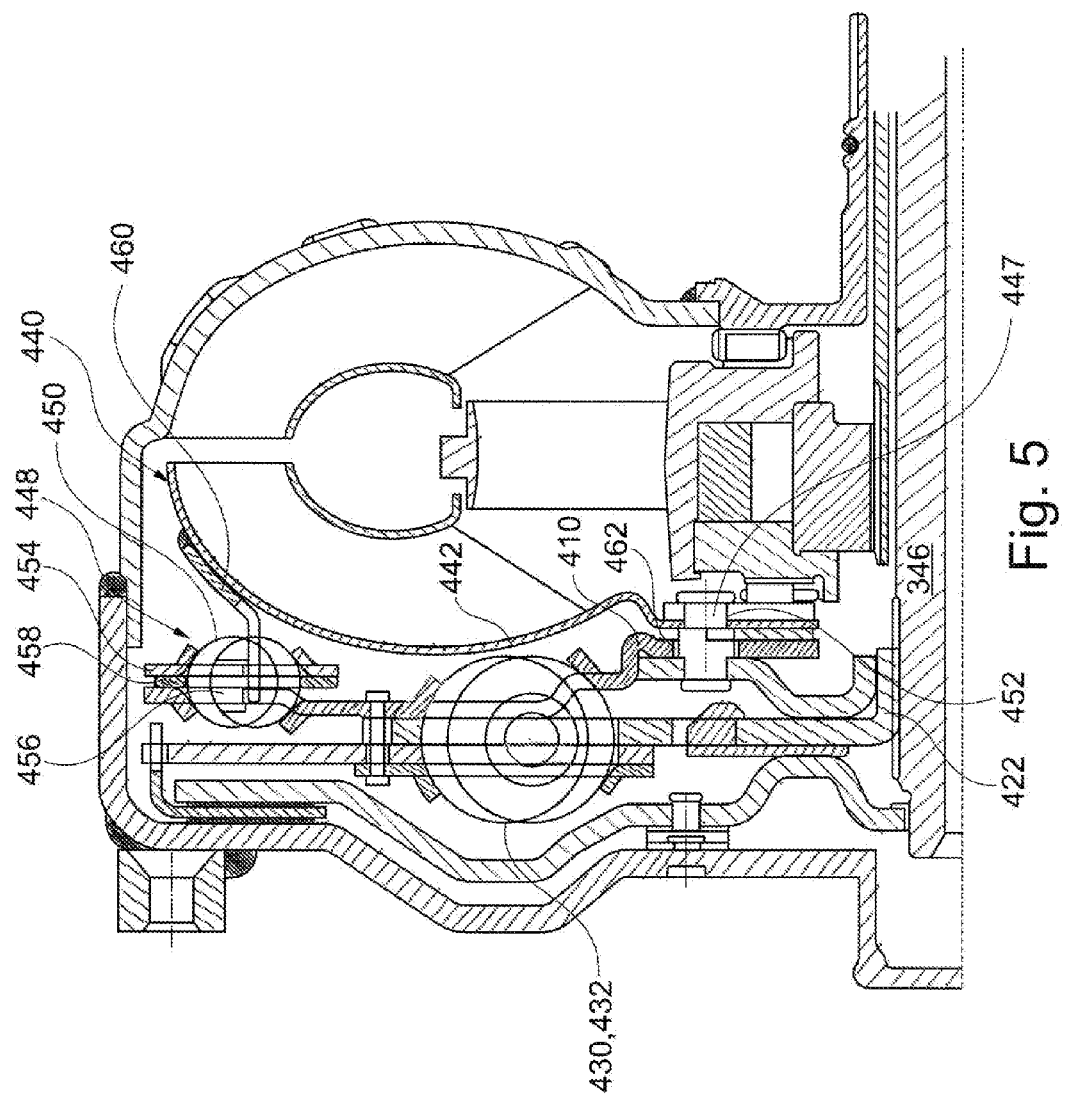
FIG. 5 is a top half section view of a torque converter including a damper assembly according to an example aspect.

The following description is made with reference to FIG. 5. FIG. 5 is a top half section view of torque converter 300 including damper assembly 400. The configuration of torque converter 100 generally applies to torque converter 300 with the exception that converter 300 includes damper 400 in place of damper 200. Likewise, the general discussion of converter 200 generally applies to damper 400 with the exceptions noted below.

Damper 400 includes turbine mass absorber, or tilger damper 448. Damper 448 includes elastic element 450 and friction element 452. In an example embodiment shown in FIG. 5, element 450 is a coil spring and element 452 is a diaphragm spring operating between turbine shell 442 and plate 410. Damper 448 includes cover plate 454 connected to plate 410 by spacer bolt 456. Flange 458 is disposed between plates 410 and 454, and is drivingly engaged with turbine tab 460. An example configuration of damper 448 is disclosed in commonly assigned U.S. Provisional Application Ser. No. 61/323,309, incorporated herein by reference.

Element 450 is disposed radially outside of elastic elements 430 and 432. Element 452 is disposed radially inside of elements 430 and 432. Plate 410 is not fixedly connected to shell 442 as with plate 210 and shell 242, but is instead connected by spacer bolt 447 disposed in slot 462 in plate 410. Slot 462 allows limited circumferential motion of turbine assembly 440 relative to plate 410. Centering plate 464 is fixed to shell 442 by rivet 447 and axially retains plate 410. Plate 464 centers turbine assembly 440 relative to input shaft 346 through flange hub 422. A general description of the operation of damper 448 can be found in commonly assigned United States Patent Application Publication No. 2009/0125202 A1.

Figure 6:
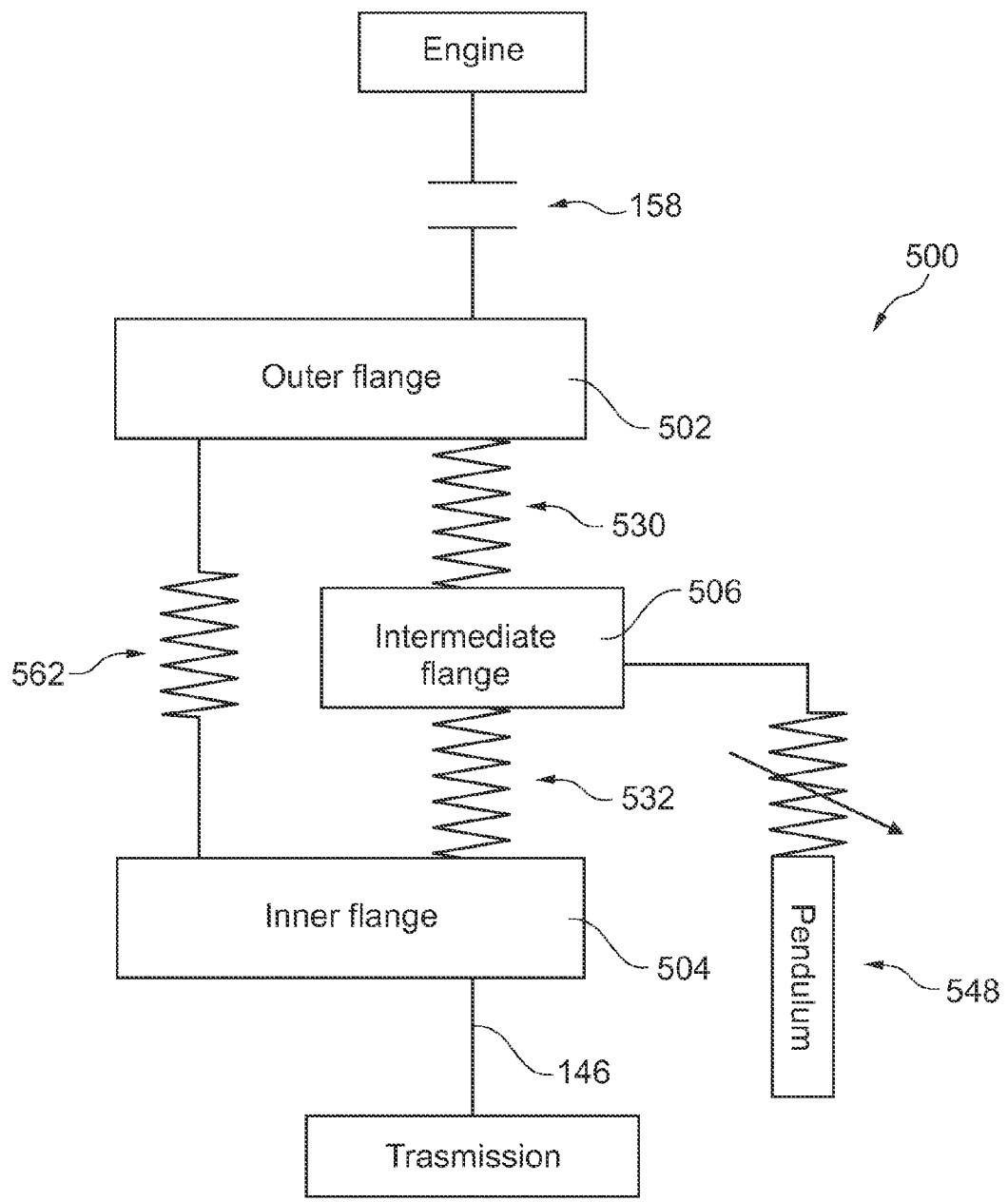
FIG. 6 is a schematic view of a damper assembly according to an example aspect.

The following description is made with reference to FIG. 6. FIG. 6 is a schematic view of a damper assembly 500. Assembly 500 is schematically similar to damper assembly 200 shown in FIG. 4. However, assembly 500 includes additional spring set 562 drivingly engaged flange 502 and flange 504. In an example embodiment (not shown), set 562 is disposed at radius R and circumferentially offset from spring sets 530 and 532. In an example embodiment (not shown), set 562 is disposed radially inside or outside of sets 530 and 532.

Although damper 500 is shown with pendulum damper 548, damper 500 may include a tilger damper as described for damper 400 above, or may have no additional damper and function as described in commonly assigned United States Patent Application Publication No. 2010/0096788 A1. Although specific applications of dampers 200, 400, and 500 are disclosed, other applications may exist and should be considered within the scope. For example, dampers 200, 400, and/or 500 may be used for a dual mass flywheel or in conjunction with a hybrid slip clutch.

Of course, changes and modifications to the above examples should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What I claim is:

1. A damper for a torque converter comprising:
   an input flange comprising a first spring guiding portion and arranged for connection to a cover for the torque converter;
   an output flange comprising a second spring guiding portion and arranged for connection to an input shaft for a transmission; and,
   an intermediate flange, rotatable relative to the input flange and the output flange, wherein the intermediate flange comprises at least two fixedly-connected plates, and wherein the first and second spring guiding portions are disposed axially between the plates.

2. The damper of claim 1, wherein the first and second spring guiding portions are radially aligned and circumferentially offset.

3. The damper of claim 2, further comprising:
   a first elastic element circumferentially disposed within the first spring guiding portion and operating in a torque path between the input flange and the intermediate flange; and,
   a second elastic element circumferentially disposed within the second spring guiding portion and operating in series with the first elastic element in a torque path between the intermediate flange and the output flange.

4. The damper of claim 3 wherein the first and second elastic elements comprise coil springs.

5. The damper of claim 3, further comprising a turbine assembly, wherein the turbine assembly is attached to at least one of the at least two plates.

6. The damper assembly of claim 5, further comprising a bearing side plate, wherein the turbine assembly and the bearing side plate are fixedly attached to the at least one plate by riveting.

7. The damper of claim 5, further comprising a pendulum assembly, wherein the pendulum assembly is attached to at least one of the at least two plates.

8. The damper assembly of claim 7, wherein the pendulum assembly is disposed radially outside of the elastic elements.

9. The damper of claim 5, further comprising a tilger damper including an elastic element and a friction element, wherein the turbine assembly is attached to the at least one plate by the tilger damper.

10. The damper of claim 9, wherein the tilger elastic element is disposed radially outside of the first and second elastic elements.

11. The damper of claim 10, wherein the tilger friction element is disposed radially inside of the first and second elastic elements.

12. A damper assembly for a torque converter comprising:
- an input flange clutchingly engaged with a cover for the torque converter;
- an output flange arranged for driving engagement with an input shaft for a transmission;
- a cover plate rotatable relative to the input flange and the output flange;
- a first spring set disposed at a first radius and engaged with respective spring guiding portions of the input flange and the cover plate; and
- a second spring set disposed at the first radius and engaged with respective spring guiding portions of the cover plate and the output flange.

13. The damper assembly of claim 12 wherein the input flange, output flange, cover plate, first spring set, and second spring set comprise a first damper, and wherein the damper assembly comprises a second damper installed on the cover plate.

14. The damper assembly of claim 13, wherein the second damper is a pendulum damper.

15. The damper assembly of claim 13, wherein the second damper is a tilger damper.

16. The damper assembly of claim 15, wherein the tilger damper is a turbine mass absorber.

17. The damper assembly of claim 12 further comprising a third spring set drivingly engaged with the input flange and the output flange.

18. The damper assembly of claim 17 wherein the third spring set is disposed at the first radius.

19. The damper assembly of claim 17 wherein the third spring set is disposed at a second radius, different than the first radius.

20. The damper assembly of claim 17 further comprising a pendulum damper operating on the cover plate.

* * * * *